United States Patent [19]

Mitsui et al.

[11] Patent Number: 5,418,635
[45] Date of Patent: May 23, 1995

[54] LIQUID CRYSTAL DEVICE WITH A REFLECTIVE SUBSTRATE WITH BUMPS OF PHOTOSENSITIVE RESIN WHICH HAVE 2 OR MORE HEIGHTS AND RANDOM CONFIGURATION

[75] Inventors: Seiichi Mitsui, Nara; Hisakazu Nakamura, Tenri; Yasunori Shimada, Nara; Koji Taniguchi, Tenri; Hirohisa Tanaka, Ikoma; Naofumi Kimura, Nara, all of Japan

[73] Assignee: Sharp Kabushiki Kaisha, Osaka, Japan

[21] Appl. No.: 19,474

[22] Filed: Feb. 18, 1993

[30] Foreign Application Priority Data

Feb. 19, 1992 [JP] Japan .................. 4-031127
Jul. 10, 1992 [JP] Japan .................. 4-184084

[51] Int. Cl.⁶ ............... G02F 1/13; G02F 1/1335
[52] U.S. Cl. ................... 359/70; 359/87; 359/900
[58] Field of Search ............. 359/87, 70, 62, 859, 359/871, 900

[56] References Cited

U.S. PATENT DOCUMENTS

| | | | |
|---|---|---|---|
| 3,912,369 | 10/1975 | Kashnow | 359/396 |
| 4,116,544 | 9/1978 | Soref | 359/65 |
| 4,431,272 | 2/1984 | Yazawa et al. | |
| 4,456,336 | 6/1984 | Chung et al. | 359/82 |
| 4,519,678 | 5/1985 | Komatsubara et al. | 359/82 |
| 4,693,559 | 9/1987 | Baeger | 359/82 |
| 4,904,060 | 2/1990 | Grupp | 359/70 |
| 5,176,982 | 1/1993 | Mikogami et al. | 430/270 |
| 5,204,765 | 4/1993 | Mitsui et al. | 359/70 |
| 5,220,444 | 6/1993 | Mitsui et al. | 359/87 |
| 5,235,463 | 8/1993 | Broussoux et al. | 359/900 |

FOREIGN PATENT DOCUMENTS 57013422  1/1992  Japan .

OTHER PUBLICATIONS

D. L. White et al., Journal of Applied Physics, vol. 45, No. 11, Nov. 1974, pp. 4718–4723.
T. Uchida et al., Proceedings of the SID, vol. 29/2, 1988, pp. 157–160.
K. Ohgiichi et al., Technical Digest, Japan-Korea Joint Symposium On Information Display, EID91-61, Oct. 31–Nov. 1, 1991.

*Primary Examiner*—William L. Sikes
*Assistant Examiner*—Kenneth Parker
*Attorney, Agent, or Firm*—David G. Conlin; George W. Neuner; Kevin J. Fournier

[57] ABSTRACT

A reflective substrate is provided, in which an electrode made of a material having an optical reflecting function is provided above an insulating base substrate and an upper surface of the electrode has a continuous wave shape without any flat portions. A method for manufacturing the reflective substrate includes the steps of: forming a plurality of convex portions with two or more different heights in a region where the electrode is provided; forming a polymer resin film, which has an upper surface in a continuous wave shape without any flat portions, on the substrate with the convex portions; and forming the electrode made of a material having an optical reflecting function on the polymer resin film so that the electrode has a continuous wave shape. A liquid crystal display device using the reflective substrate is provided, which includes: a reflective substrate in which an electrode made of a material having an optical reflecting function is provided on an insulating base substrate, and an upper surface of the electrode has a continuous wave shape; a second substrate provided opposing the reflective substrate; and a liquid crystal layer sealed between the reflective substrate and the second substrate.

5 Claims, 9 Drawing Sheets

LIQUID CRYSTAL DEVICE WITH A REFLECTIVE SUBSTRATE WITH BUMPS OF PHOTOSENSITIVE RESIN WHICH HAVE 2 OR MORE HEIGHTS AND RANDOM CONFIGURATION

BACKGROUND OF THE INVENTION

1. Field of the Invention

The present invention relates to a reflective active matrix substrate and a counter substrate which do not use a backlight, a method for producing the same, and a liquid crystal display device using the same.

2. Description of the Related Art

In recent years, the application of a liquid crystal display device to a word processor, a lap-top personal computer, a miniaturized TV, etc. has been rapidly developed. In particular, a reflective liquid crystal display device, which performs a display using the reflection of light incident from outside, consumes low electric power since it is not necessary to use a backlight, and can be made thin and light-weight. For this reason, much attention is paid to the reflective liquid crystal display device. Conventionally, a twisted nematic (TN) system and a super-twisted nematic (STN) system are employed in the reflective liquid crystal display device.

However, according to these systems, half of the optical strength of natural light is not used because of a linear polarizer provided in the liquid crystal display device, so that a display becomes dark. In view of this drawback, a display mode, in which all of the optical strength of natural light can effectively be used, has been proposed. One example for this is a phase transition type guest-host system (D. L. White and G. N. Taylor. J. Appl. Phys. 45 4718 (1974)).

A liquid crystal display device using a display mode of the phase transition type guest-host system employs cholesteric-nematic phase transition phenomenon caused by an electrical field, and does not require a polarizing plate such as a linear polarizer. A reflective multi-color display obtained by combining this type of liquid crystal display device and a micro-color filter has also been proposed (Tatsuo Uchida etc. Proceedings of the SID Vol. 29/2 157 (1988)).

In order to obtain a brighter display in a display mode which does not require a polarizing plate, the strength of light, which is incident upon a display screen at any incidence angle and which is scattered in a vertical direction thereto, should be increased. For this purpose, it is required to manufacture a reflective plate with regulated optimum reflection characteristics by regulating the reflection characteristics of the reflective plate. In literature proposing the above-mentioned reflective multi-color display, a reflective plate obtained by regulating a configuration of unevenness formed on a surface of an insulating glass substrate and forming a metallic thin film such as a film made of Ag on the glass substrate with the unevenness is described.

However, in the above-mentioned reflective plate, unevenness (convex and concave portions) is formed by scratching the surface of the glass substrate with a polishing agent. Thus, uniform unevenness cannot be formed, decreasing reproducibility of the configuration of unevenness. In addition, when the glass substrate thus produced is used, a reflective liquid crystal display device having satisfactory reflection characteristics cannot stably be provided.

For the purpose of overcoming the abovementioned drawback, the applicant of the present invention has proposed the following reflective plate (Japanese Patent Application No. 3-4573).

A photosensitive resin is coated onto an insulating substrate, and the substrate thus obtained is patterned. Then, the substrate is heat-treated so that an upper edge of the pattern is made round. After that, a polymer resin is allowed to flow onto the insulating substrate with the pattern to form a polymer resin film thereon. A reflective thin film having an optical reflecting function is formed on the polymer resin film, whereby a reflective plate is obtained.

Since the reflective plate thus produced has a reflective thin film in which the surfaces of the convex and concave portions are smooth, so that multiple reflection is not likely to be caused and a bright display can be obtained. However, the reflection thin film formed on a portion of the insulating substrate, under which no pattern is provided, sometimes has a flat shape. In some cases, there is a problem in that reflected light which has dependence on a wavelength is generated to cause interference color (i.e., color generated due to interference light).

SUMMARY OF THE INVENTION

The reflective substrate of the present invention is provided, in which an electrode made of a material having an optical reflecting function is provided above an insulating base substrate and an upper surface of the electrode has a continuous wave shape without any flat portions.

According to another aspect of the present invention, a method for manufacturing a reflective substrate in which an electrode made of a material having an optical reflecting function is provided above an insulating substrate and an upper surface of the electrode has a continuous wave shape without any flat portions, includes the steps of:

forming a plurality of convex portions with two or more different heights in a region where the electrode is provided;

forming a polymer resin film, which has an upper surface in a continuous wave shape without any flat portions, on the substrate with the convex portions; and forming the electrode made of a material having an optical reflecting function on the polymer resin film so that the electrode has a continuous wave shape.

According to still another aspect of the present invention, a method for manufacturing a reflective substrate in which an electrode made of a material having an optical reflecting function is provided above an insulating base substrate and an upper surface of the electrode has a continuous wave shape without any flat portions, includes the steps of:

forming a first film having a plurality of convex portions with two or more different heights on one surface of the insulating base substrate on which the electrode is to be provided;

coating a liquid material onto the insulating base substrate on which the first film is formed and hardening the resulting substrate to form a second film at least on the convex portions and concave portions between the convex portions; and forming the electrode on the second film.

According to still another aspect of the present invention, a liquid crystal display device includes:
- a reflective active matrix substrate in which an electrode made of a material having an optical reflecting function is provided on an insulating base substrate, and an upper surface of the electrode has a continuous wave shape;
- a second substrate provided opposing the reflective active matrix substrate; and
- a liquid crystal layer sealed between the reflective active matrix substrate and the second substrate.

Thus, the invention described herein makes possible the advantages of (1) providing a reflective substrate provided with a reflective plate having satisfactory reflection characteristics which are less dependent upon a wavelength, the reflection characteristics being obtained with good reproducibility; (2) providing a method for producing the reflective substrate provided with a reflective plate having satisfactory reflecting characteristics which are less dependent upon a wavelength, the reflection characteristics being obtained with good reproducibility; and (3) providing a liquid crystal display device using the reflective substrate.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrating examples with reference to the drawings.

First of all, a fundamental principle of the present invention will be described.

Figure 6:
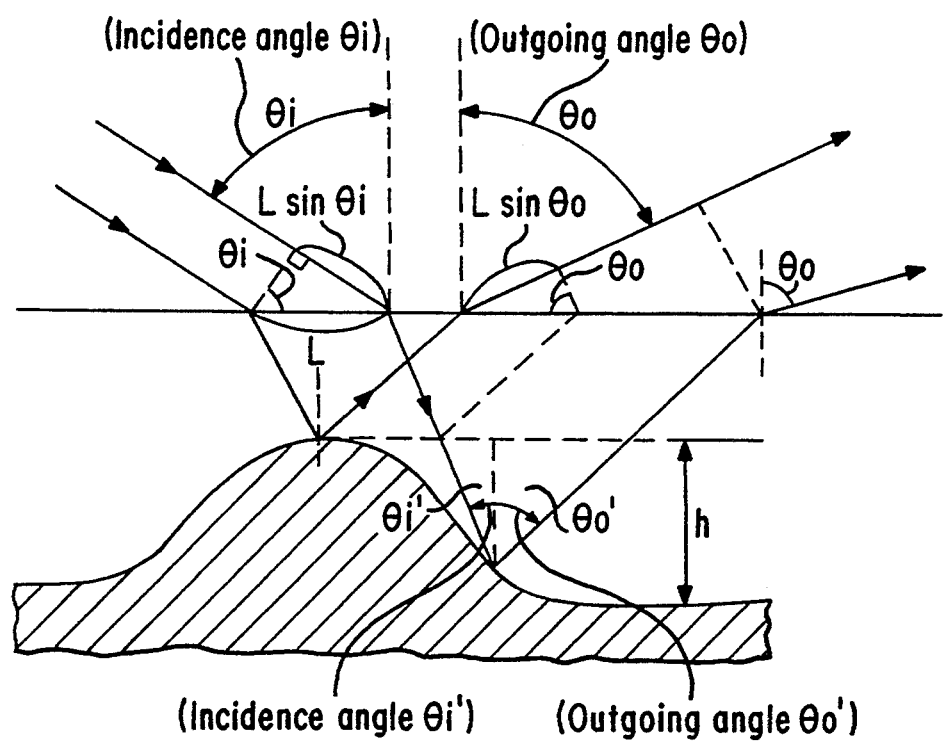
FIG. 6 is a schematic diagram illustrating the generation of interference light.

FIG. 6 shows a state in which light is incident upon a glass substrate and the incident light is reflected from a reflective film to be outgoing from the glass substrate. It is considered that interference light is generated in the case where lights which is incident upon the glass substrate at an incidence angle of $\theta i$ is reflected from the top and foot of a convex portion of the reflective film and are outgoing from the glass substrate at an outgoing angle of $\theta o$. At this time, the optical path difference $\delta$ between the light reflected from the top and that reflected from the foot is represented by the following Equation 1.

$$\begin{aligned}\delta &= L\sin\theta i + h(1/\cos\theta i' + 1/\cos\theta o') \cdot n - \\ &\quad \{L\sin\theta o + h(\tan\theta i' + \tan\theta o')\sin\theta o\} \\ &= L(\sin\theta i - \sin\theta o) + h\{(1/\cos\theta i' + 1/\cos\theta o') \cdot n - \\ &\quad (\tan\theta i' + \tan\theta o')\sin\theta o\}\end{aligned} \quad (1)$$

where, $\theta i'$ is an incidence angle of the light at the foot of the reflective film; $\theta o'$ is an outgoing angle of the light at the foot thereof; L is a distance between the incidence points of both lights on the glass substrate; h is a height between the reflected points of both lights on the top and foot of the reflective film; and n is a reflectance of the glass substrate.

Equation 1 can be calculated only when $\theta i = \theta o$, $\theta i' = \theta o'$. Thus, suppose $\theta i = \theta o = \theta$, $\theta i' = \theta o' = \theta'$, the optical path difference $\delta$ is represented by the following Equation 2:

$$\delta = h\{2n/\cos\theta' - 2\tan\theta' \cdot \sin\theta\} \quad (2)$$

When arbitrary wavelengths $\lambda 1$ and $\lambda 2$ are considered, a light with $\lambda 1$ and a light with $\lambda 2$ weaken each other in the case of $\delta/\lambda 1 = m \pm \frac{1}{2}$ (m is an integer); and a light with $\lambda 1$ and a light with $\lambda 2$ strengthen each other in the case of $\delta/\lambda 2 = m$. Thus, the following Equation 3 can be obtained.

$$\delta(1/\lambda 1 - 1/\lambda 2) = \pm \frac{1}{2} \quad (3)$$

Equation 3 can also be expressed as follows:

$$\delta = (\lambda 1 \cdot \lambda 2)/\{2 \cdot (\lambda 2 - \lambda 1)\} \quad (4)$$

Thus, from Equations 2 and 4, the height h can be represented by the following Equation 5:

$$h = \frac{1}{2} \cdot \{(\lambda 1 \cdot \lambda 2)/(\lambda 2 - \lambda 1)\} \cdot \{\cos\theta'/(2n - 2\sin\theta' \cdot \sin\theta)\} \quad (5)$$

As described above, the inventors of the present invention found that in order to prevent interference light, the surface of the reflective film should be formed in a continuous wave shape without any flat portions.

In view of the above, according to the present invention, the following method for forming a reflective film is used.

Two or more convex portions with different heights are formed on a base member in a plate shape. Then, a film made of a polymer resin and the like is formed on the base member with the convex portions, and a reflection thin film with a optical reflecting function is formed thereon.

When the reflective thin film thus formed is applied to a pixel electrode on an active matrix substrate and/or a counter electrode on a counter substrate, the pixel electrode and/or the counter electrode have a reflective surface with a continuous wave shape without any flat portions, so that reflected light rays do not interfere with each other. Moreover, in the case where the convex portions are optically formed by using a photomask, the formation of the convex portions is made possible with good reproducibility under the same light irradiation conditions.

Examples

Example 1

Figure 1:
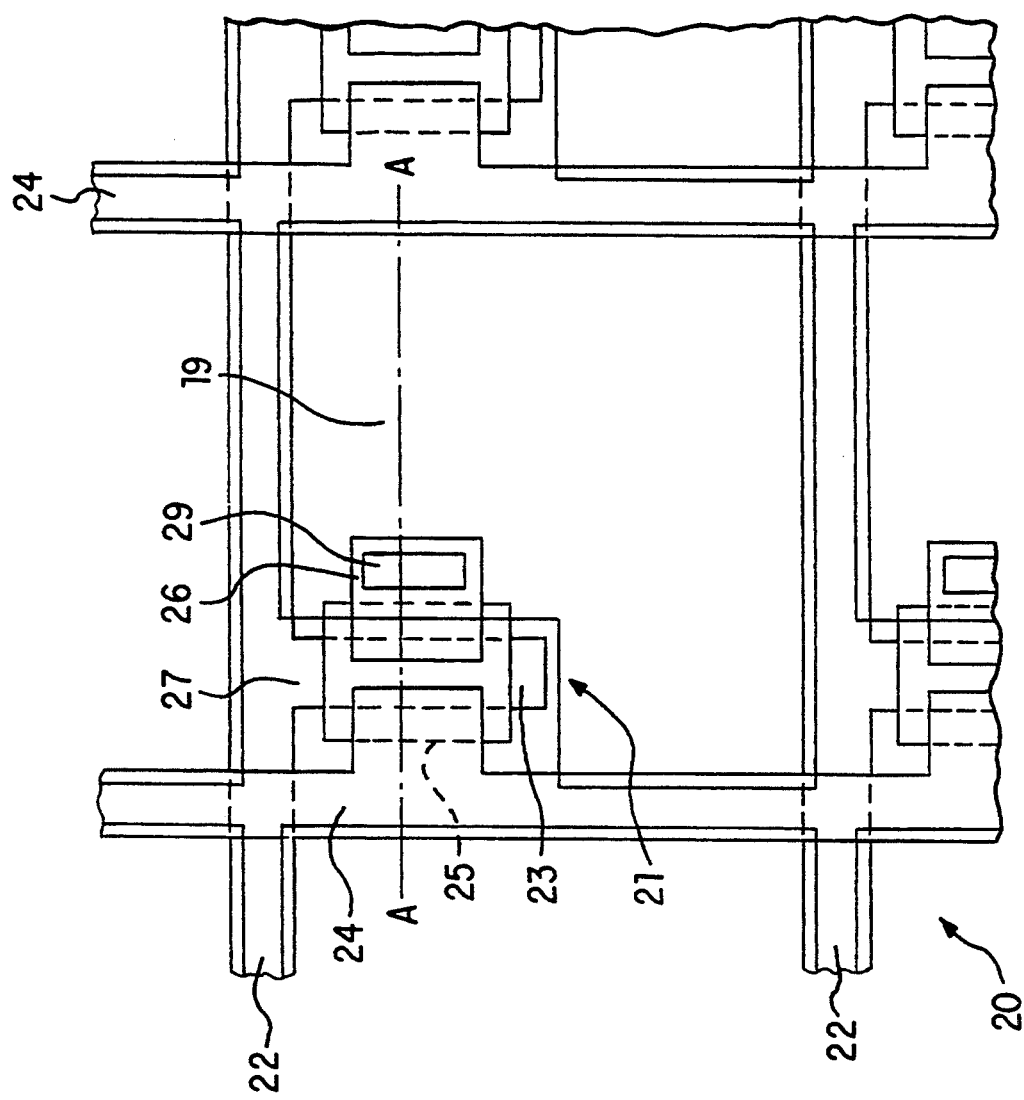
FIG. 1 is a plan view showing a reflective active matrix substrate of Example 1.
Figure 2:
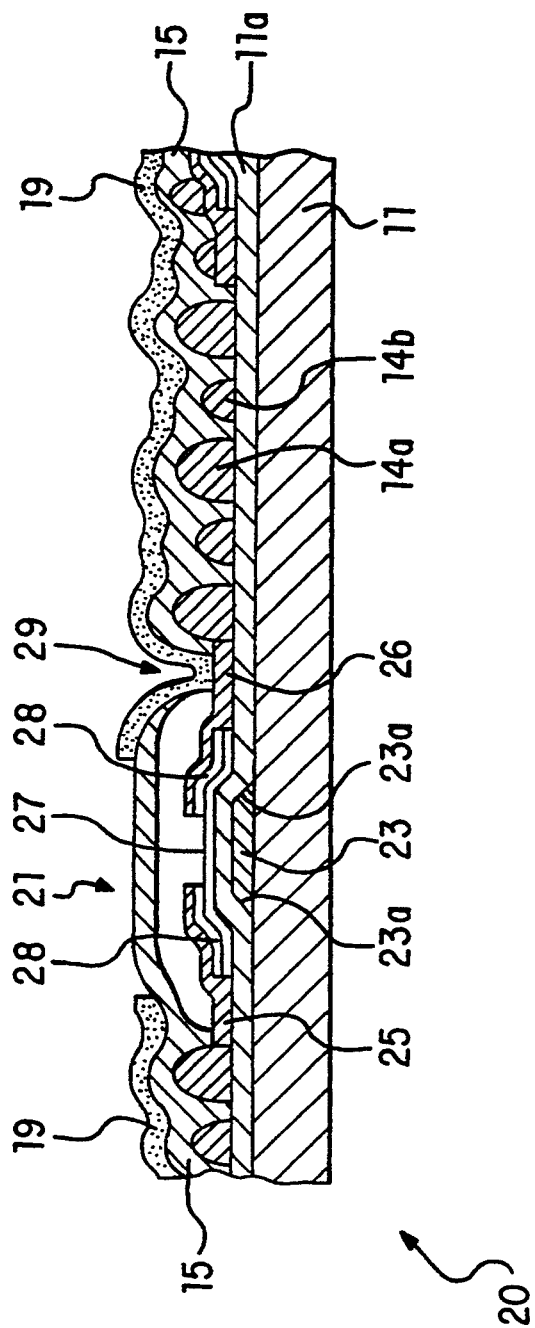
FIG. 2 is a cross-sectional view taken along a line A—A of FIG. 1.

FIG. 1 is a plan view showing an example of a reflective active matrix substrate 20 according to the present invention. FIG. 2 is a cross-sectional view taken along a line A—A of FIG. 1. In the reflective active matrix substrate 20, a plurality of gate bus lines 22 (i.e., scanning lines) and a plurality of source bus lines 24 (i.e., signal lines) are provided on an insulating glass substrate 11 (i.e., a base substrate) so as to cross each other. In a rectangular region formed by each gate bus line 22 and each source bus line 24, a pixel electrode 19 having an optical reflection function is provided. At one corner of the rectangular region in which each pixel electrode 19 is formed, a gate electrode 23 is branched out from each gate bus line 22, and at the tip end portion of each gate electrode 23, a thin film transistor (TFT) 21 is formed as a switching element. The gate electrode 23 forms a part of the TFT 21.

Furthermore, at one corner of the rectangular region in which each pixel electrode 19 is formed, a source electrode 25 is branched out from each source bus line 24. The tip end portion of the source electrode 25 overlaps the gate electrode 23 in an insulating state. The source electrode 25 forms a part of the TFT 21. A drain electrode 26 of the TFT 21 is provided at a distance from the source electrode 25 and overlaps the gate electrode 23 in an insulated state. Each drain electrode 26 is electrically connected to each pixel electrode 19.

As shown in FIG. 2, the TFT 21 is provided above the gate electrode 23 formed on the glass substrate 11. The gate electrode 23 is covered with a gate insulating film 11a which is formed over the entire surface of the glass substrate 11. On a part of the gate insulating film 11a, a semiconductor layer 27 is formed so as to cover a region above the gate electrode 23. A pair of contact layers 28 are formed covering both ends of the semiconductor layer 27. The source electrode 25 is formed so as to cover one of the pair of contact layers 28 and the drain electrode 26 is formed so as to cover the other one of the pair of contact layers 28.

Below the pixel electrode 19 having the above-mentioned optical reflection function, convex portions 14a and 14b are alternately formed on the glass substrate 11. The height of the convex portions 14a is made larger than that of the convex portions 14b. A polymer resin film 15 is formed so as to cover the convex portions 14a and 14b. The upper surface of the polymer resin film 15 is in a wave shape because of the presence of the convex portions 14a and 14b. The polymer resin film 15 is formed over almost the entire surface of the glass substrate 11 as well as below the pixel electrode 19. In the present example, the polymer resin film 15 is formed of a photosensitive resin (Trade name: OFPR-800, manufactured by Tokyo Ohka Kogyo Co., Ltd.). The pixel electrode 19 is formed on the polymer resin film 15 with a surface in a continuous wave shape and is formed of, for example, Al which has an optical reflection function. The pixel electrode 19 is electrically connected to the drain electrode 26 via a contact hole 29.

Next, a method for manufacturing the pixel electrode section 19, which is a main portion of the above-mentioned reflection active matrix substrate 20, will be described with reference to FIG. 3.

Figure 3A:
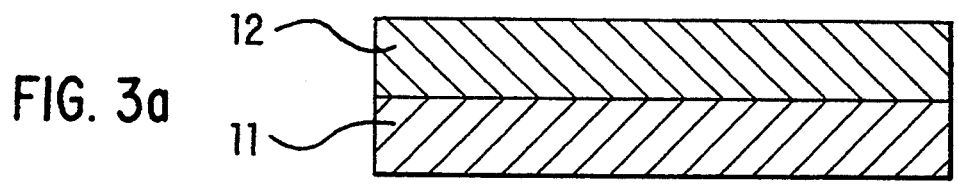
FIGS. 3a to 3e are cross-sectional views illustrating the process for manufacturing a pixel electrode in the reflective active matrix substrate in FIG. 1.

As shown in FIG. 3a, a resist film 12 made of a photosensitive resin is formed on the glass substrate 11 by spin coating. In the present example, a glass substrate with a thickness of 1.1 mm (Trade name: 7059, manufactured by Corning Inc.) is used as the glass substrate 11. As the resist film 12, the above-mentioned photosensitive resin (Trade name: OFPR-800, manufactured by Tokyo Ohka Kogyo Co., Ltd.) is used. The resist film 12 is preferably formed by spin coating in the range of 500 r.p.m. to 3000 r.p.m. In the present example, the resist film 12 is formed by spin coating at 1500 r.p.m. for 30 seconds, and the thickness thereof is 2.5 $\mu$m. In the present example, OFPR-800 manufactured by Tokyo Ohka Kogyo Co., Ltd. is used; however, the present invention is not limited thereto. Any positive or negative photosensitive resin material capable of being patterned by an exposure process can be used. For example, OMR-83, OMR-85, ONNR-20, OFPR-2, OFPR-830, or OFPR-500 manufactured by Tokyo Ohka Kogyo Co., LTd.; or TF-20, 1300-27, or 1400-27 manufactured by Shipley Far East Ltd. can be used. In addition, photoneece manufactured by Toray Industries Inc.; RW101 manufactured by Sekisui Fine Chemical Co., Ltd; and R101, R633 manufactured by Nippon Kayaku Co., Ltd. can be used.

Figure 3B:
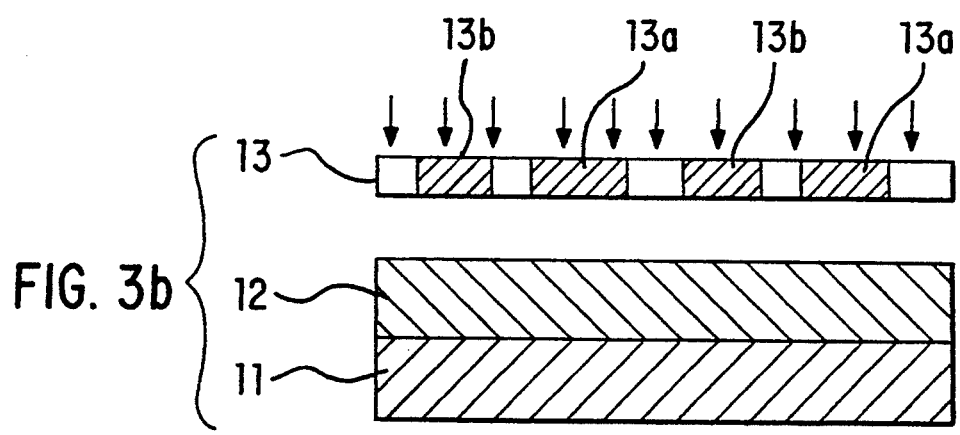
Figure 4:
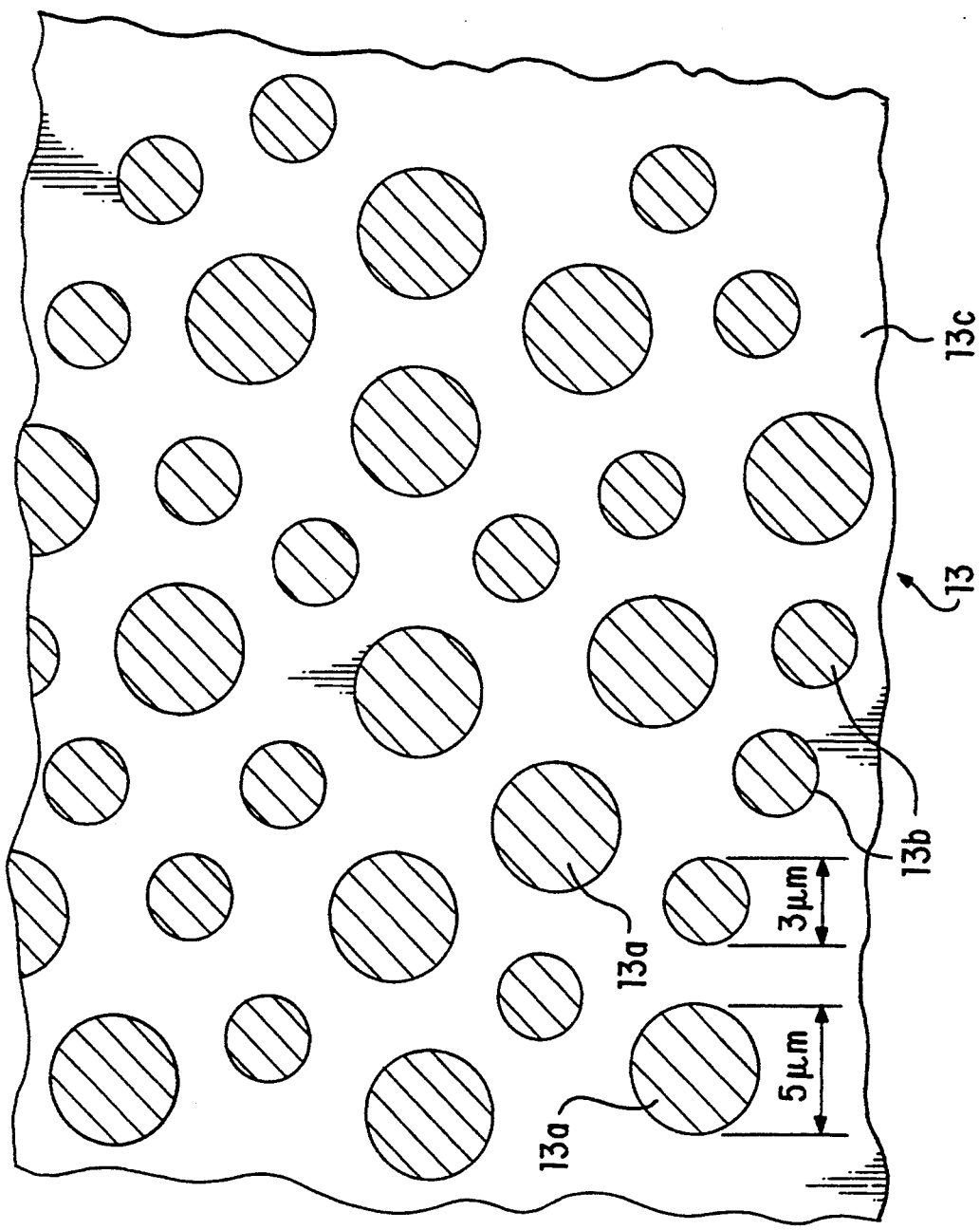
FIG. 4 is a plan view showing a photomask used for manufacturing the reflective active matrix substrate of Example 1.

Next, the glass substrate 11 on which the resist film 12 is formed is pre-baked, for example, at 90° C. for 30 minutes. A photomask 13 shown in FIG. 4 is placed above the resist film 12 as shown in FIG. 3b, and under this condition, the photomask 13 is exposed to light as represented by the arrows. The photomask 13 is made of a plate 13c having pattern holes 13a and 13b. In the present example, the pattern hole 13a has a round shape with a diameter of 5 $\mu$m, and the pattern hole 13b has a round shape with a diameter of 3 $\mu$m. These pattern holes 13a and 13b are formed in the plate 13c at random, and the distance between adjacent pattern holes 13a and 13b is 2 $\mu$m or more. Here, it is noted that if the distance is too large, it is difficult to make the upper surface of the polymer resin film 15 a continuous wave shape. In the present example, the configuration of the pattern holes 13a and 13b of the photomask 13 is round; however, any shape such as a rectangle, an oval, and a stripe can be used.

Figure 3C:
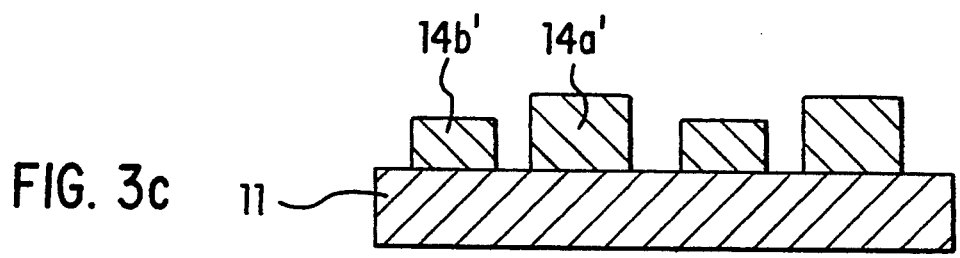

Next, a laminate thus obtained (i.e., the glass substrate 11 and the resist film 12) is developed in a developing solution of 2.38% made from, for example, NMD-3 manufactured by Tokyo Ohka Kogyo Co., Ltd. Due to the development, as shown in FIG. 3c, a plurality of minute convex portions 14a' and 14b' with different heights are formed on one surface of the glass substrate 11. The upper corners of the convex portions 14a' and 14b' are square. Here, the heights of the regions corresponding to the convex portions 14a' and 14b' are identical shortly after the exposing step. However, the respective convex portions 14a' and 14b' will have different heights during the developing step, due to the difference of crosssections of the hardened convex portions 14a' and 14b'. In the present example, the convex portion 14a with a height of 2.48 $\mu$m is formed by the pattern hole 13a with a diameter of 5 $\mu$m; and the convex portion 14b with a height of 1.64 μm is formed by the pattern hole 13b with a diameter of 3 μm. The height of the convex portions 14a' and 14b' can be varied dependent on the size of the pattern holes 13a and 13b, exposure time, and developing time. The size of the pattern holes 13a and 13b is not limited to the above-mentioned one.

In the present example, commercially available NMD-3 (a developing solution of 2.38%) is used. The concentration thereof is preferably in the range of 1% to 5%. Moreover, in addition to NMD-3, examples of the developing solution include NMD-W and DE-3 (both of them are manufactured by Tokyo Ohka Kogyo Co., Ltd.)

Figure 3D:
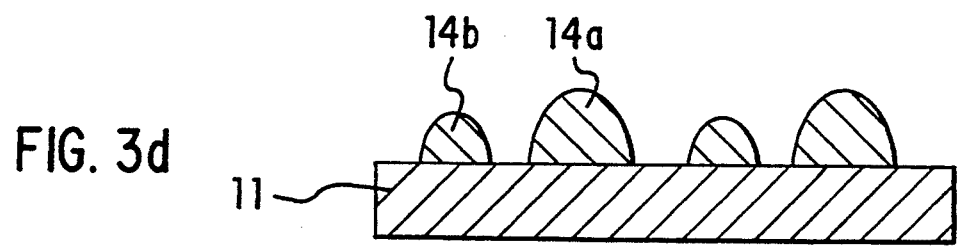

Next, the glass substrate 11 on which the convex portions 14a' and 14b' are formed is heat-treated at 200° C. for one hour, whereby the convex portions 14a' and 14b' are softened. Thus, the upper corners of the convex portions 14a' and 14b' are bent as shown in FIG. 3d.

Figure 3E:
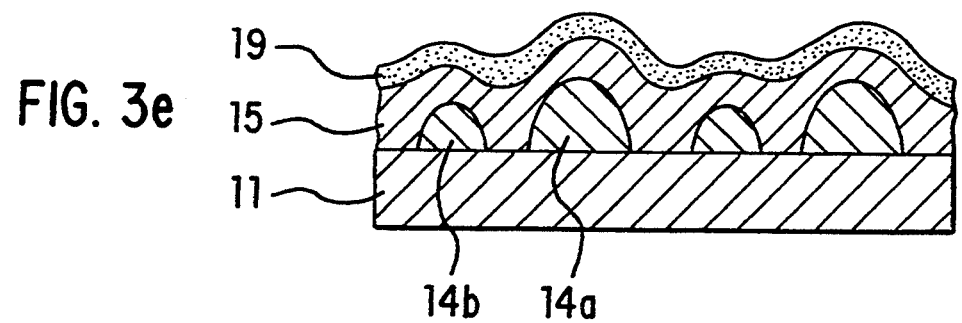

On the glass substrate 11 which has been heat-treated, the polymer resin film 15 is formed by spin coating as shown in FIG. 3e. As a polymer resin, the above-mentioned OFPR-800 is used. The polymer resin film 15 is formed by spin coating, preferably in the range of 1000 r.p.m. to 3000 r.p.m. In the present example, the polymer resin film 15 is formed by spin coating at 2000 r.p.m. As a result, the polymer resin film 15 with an upper surface in a continuous wave shape can be formed even on a flat portion (i.e., a portion between the convex portions 14a and 14b) on the glass substrate 11.

After this, the pixel electrode 19 made of Al is formed on the polymer resin film 15, for example, by sputtering. In addition to Al, examples of the material used for the pixel electrode 19 include Ni, Cr, Ag, and the like having an optical reflecting function. The thickness of the pixel electrode 19 is preferably in the range of about 0.01 to 1.0 μm.

The pixel electrode 19 with an optical reflecting function thus formed has an upper surface in a continuous wave shape without any flat portions, since the polymer resin film 15 is formed having an upper surface in a continuous wave shape.

Figure 5:
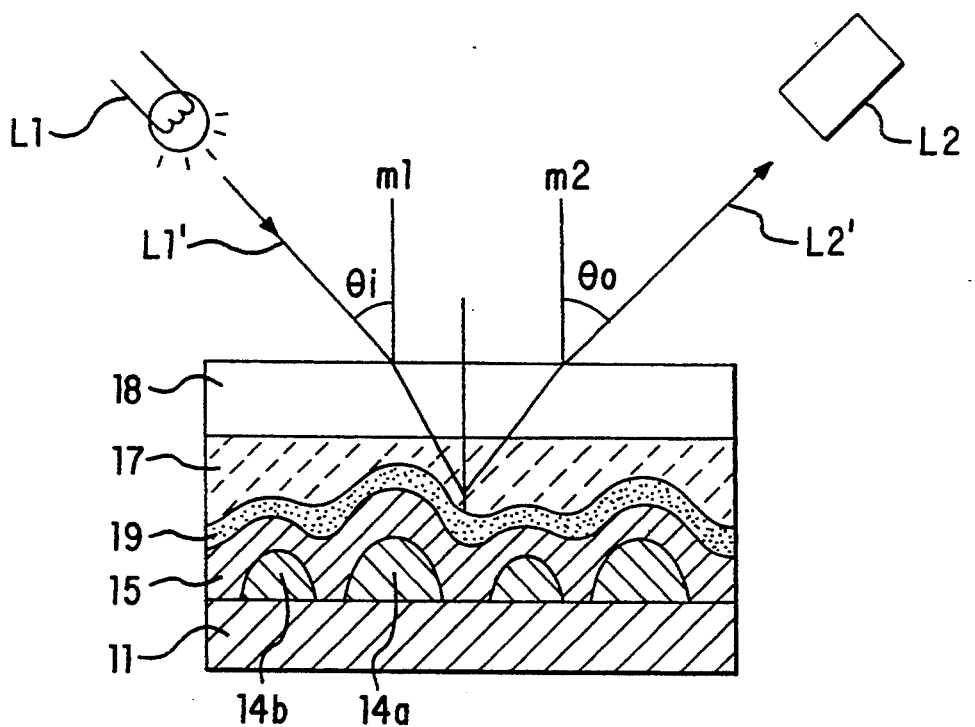
FIG. 5 is a view illustrating a method for measuring the reflection characteristics of the pixel electrode having an optical reflecting function.

The wavelength dependence of light reflected from the pixel electrode 19 is measured as shown in FIG. 5. In FIG. 5, a structure in which the pixel electrode 19 is used in an actual liquid crystal display device is shown. More specifically, a dummy glass 18 made of glass with a refractive index of 1.5 with respect to a real liquid crystal layer is used as a glass substrate. The dummy glass 18 is brought into contact with the reflective active matrix substrate 20 through a UV-curable adhesive 17 with a refractive index of 1.5.

An optical source L1 is placed so that incident light L1' is incident upon the dummy glass 18 at an incidence angle of $\theta i$ (i.e., an angle formed by the incident light Li' and a normal line m1); and a photomultimeter L2 is placed so as to receive light L2' outgoing through the dummy glass 18 at an outgoing angle $\theta o$ (i.e., an angle formed by the reflected light L2' and a normal line m2). Thus, the photomultimeter L2 measures the strength of the light which is incident upon the dummy glass 18 at the incidence angle of $\theta i$ and outgoing therethrough at an outgoing angle $\theta o$. In the present example, in order that the light emitted from the optical source L1 and reflected from the surface of the dummy glass 18 is not received by the photomultimeter L2, the incidence angle $\theta i$ is taken as 30° and the outgoing angle $\theta o$ is taken as 20°.

Figure 7A:
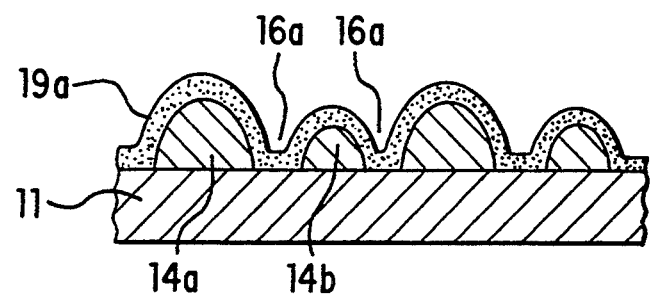
FIG. 7a is a cross-sectional view showing a pixel electrode of Comparative Example 1.
Figure 7B:
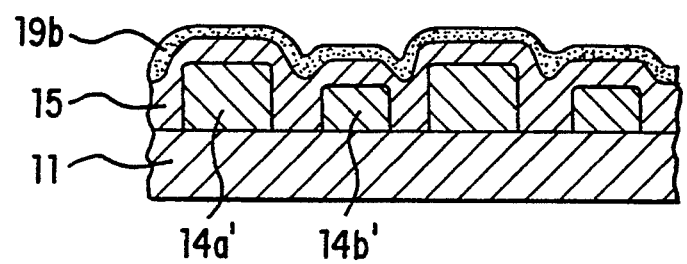
FIG. 7b is a cross-sectional view showing a pixel electrode of Comparative Example 2.

For comparison, a pixel electrode 19a (Comparative Example 1) formed as shown in FIG. 7a and a pixel electrode 19b (Comparative Example 2) as shown in FIG. 7b are also measured. In Comparative Example 1, the pixel electrode 19a is directly formed on the round convex portions 14a and 14b without forming the polymer resin film. Thus, flat portions 16a are formed between the convex portions 14a and 14b. In Comparative Example 2, the pixel electrode 19b is formed on the convex portions 14a' and 14b' with square upper corners, the polymer resin film 15 being sandwiched between the pixel electrode 19b and the convex portions 14a' and 14b'. Thus, portions of the pixel electrode 19b above the convex portions 14a' and 14b' are in a substantially flat shape. The pixel electrodes 19a and 19b are both formed of Al.

Figure 8:
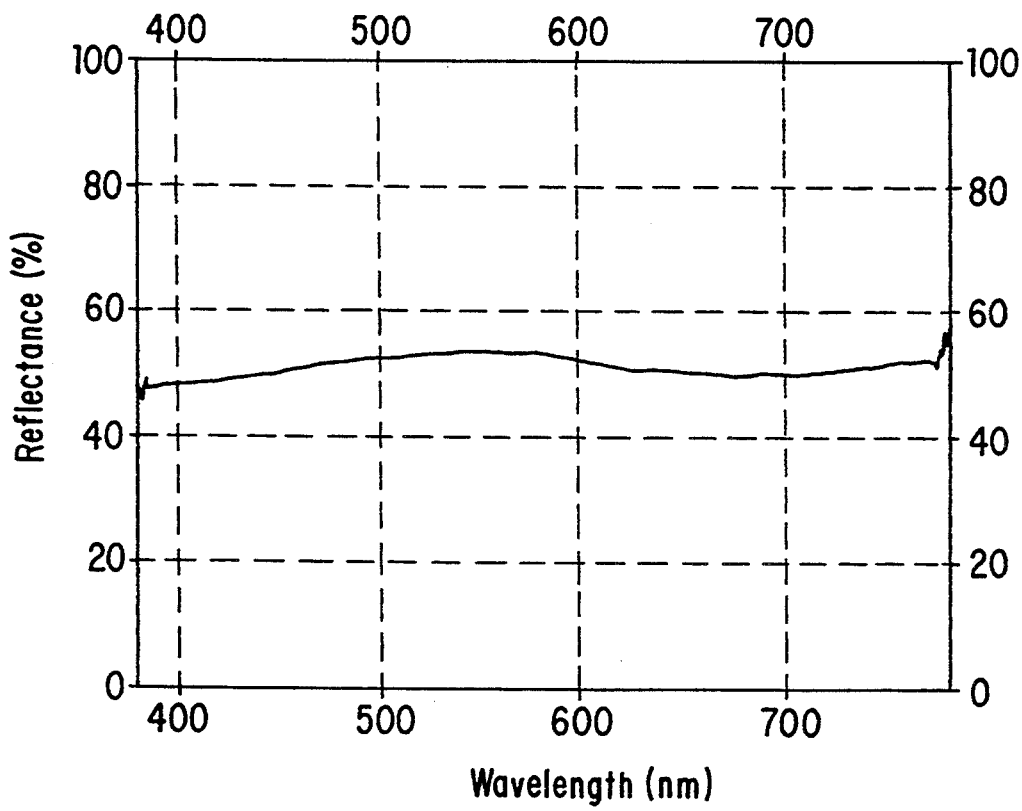
FIG. 8 is a graph showing the relationship between a reflectance and a wavelength of the pixel electrode of Example 1.
Figure 9A:
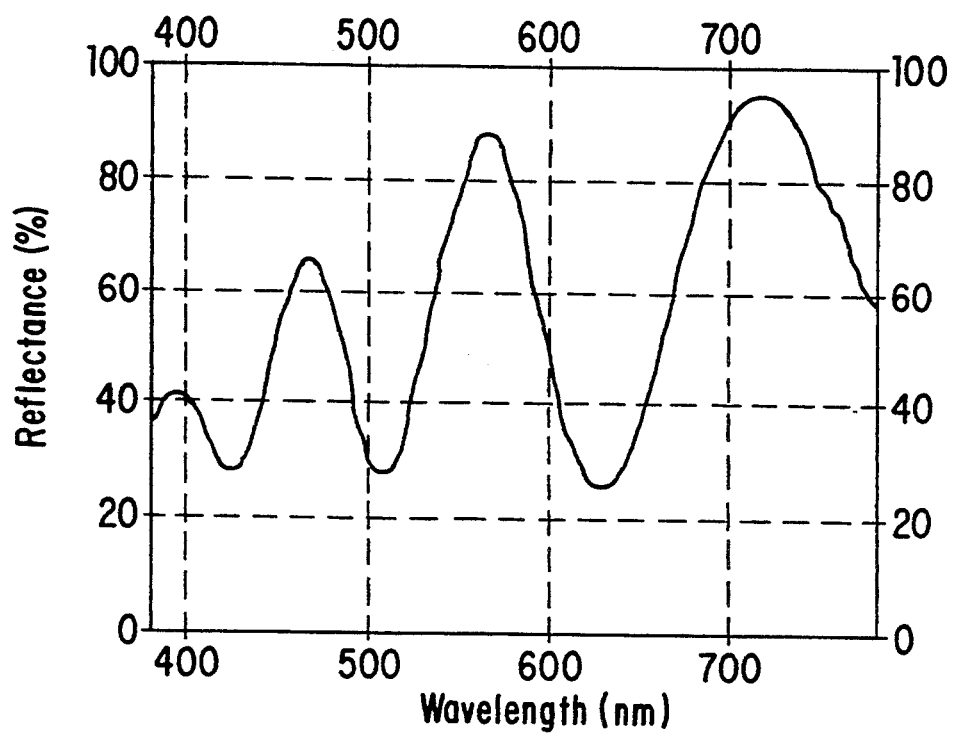
FIG. 9a is a graph showing the relationship between a reflectance and a wavelength of the pixel electrode of Comparative Example 1.
Figure 9B:
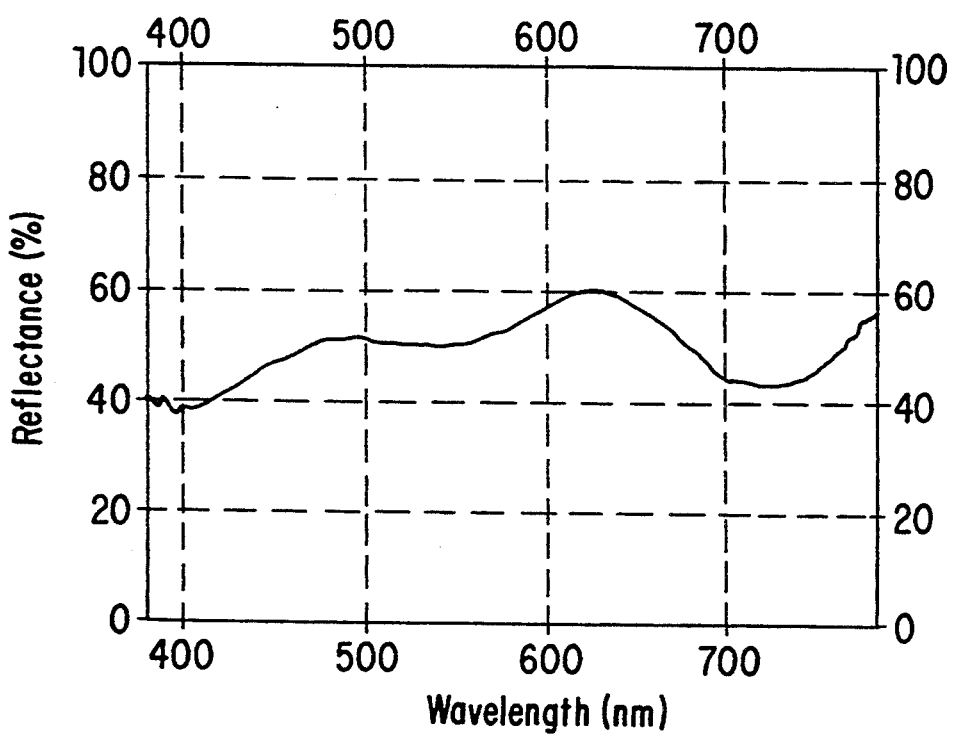
FIG. 9b is a graph showing the relationship between a reflectance and a wavelength of the pixel electrode of Comparative Example 2.

FIG. 8 shows reflecting characteristics (wavelength dependence) for the reflected light of the present example. FIGS. 9a and 9b show reflecting characteristics (wavelength dependence) of reflected light in Comparative Examples 1 and 2. In FIGS. 8, 9a and 9b, a horizontal axis is taken as a wavelength and a vertical axis is taken as a reflectance. As is understood from these figures, in both Comparative Examples 1 and 2, the reflectance is dependent upon the wavelength, and these examples have a problem of causing interference color. In contrast, in the present example, the reflectance is less dependent upon the wavelength, and thus, the reflected light has no interference light. The measurements are conducted under the above-mentioned conditions, so that the results are equivalent to reflecting characteristics between the surface of the pixel electrode 19 and the real liquid crystal layer. That is, the results of the present example are equivalent to those obtained in the case of an actual application.

Example 2

Figure 10A:
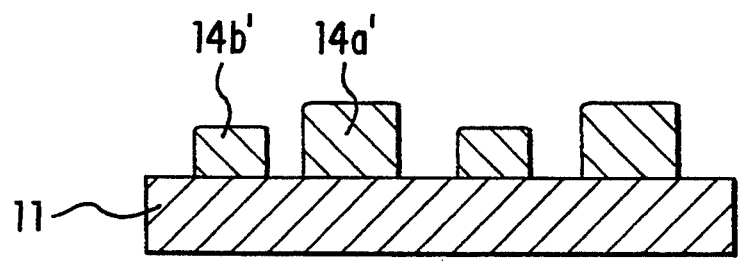
FIGS. 10a to 10c are cross-sectional views illustrating the process for manufacturing the pixel electrode of FIG. 1 by another method.
Figure 10B:
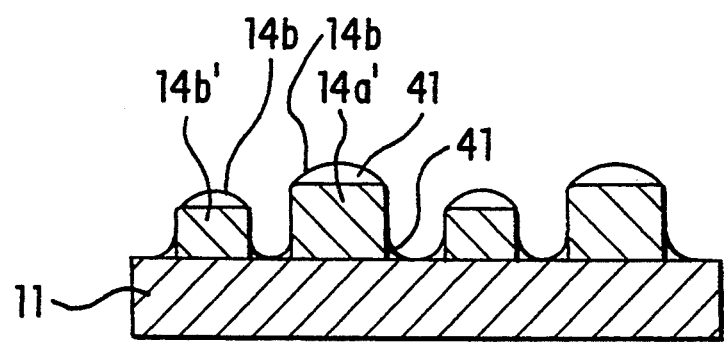
Figure 10C:
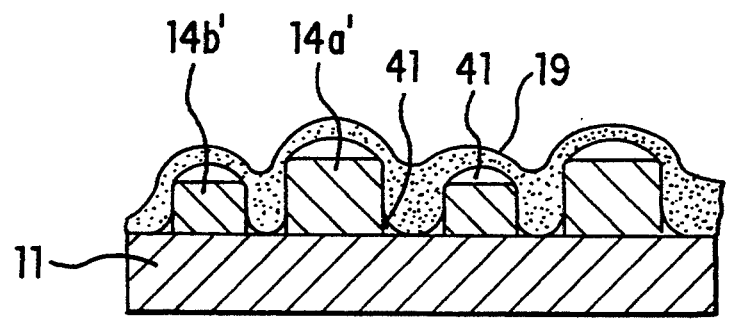

FIGS. 10a to 10c show a process for manufacturing the pixel electrode of Example 1 by another method. As shown in FIG. 10a, the convex portions 14a' and 14b' with different heights are formed on the glass substrate 11 in the same way as in Example 1. Here, a film having the convex portions 14a' and 14b' is referred to as a first film.

Next, as shown in FIG. 10b, a liquid material such as an acrylic resin is coated onto the convex portions 14a', 14b' and between adjacent convex portions and is hardened to form a second film 41. At this time, the liquid material is in a convex shape on the convex portions 14a' and 14b' due to surface tension; and the liquid material is in a concave shape between the adjacent convex portions. Thus, after hardening, new convex portions 14a and 14b are formed on the surface of the glass substrate 11.

Next, as shown in FIG. 10c, the pixel electrode 19 made of a light reflective material is formed on the second film 41.

When the liquid material is coated onto the first film so that the glass substrate 11 is not exposed, no flat portions are formed on the first film with the convex portions 14a' and 14b'. Thus, a reflective plate which is less dependent upon a wavelength can be obtained. As a material for the second film 41, in addition to the acrylic resin, epoxy type resins or the like in a liquid state, which can be hardened after being coated, can be used. As a material for the pixel electrode 19, Al, Ag, Ni, Cr, etc. having a high reflectance can be used.

The pixel electrode 19 thus manufactured is less dependent upon a wavelength in the same way as in Example 1, and hardly generates any interference light.

In Example 2, the convex portions 14a' and 14b' with different heights are formed in the same way as Example 1; however, another method can be used. An example of this will briefly be described as follows:

First, for the purpose of forming the convex portions 14b' with a smaller height, a resist film is formed on the glass substrate 11 so as to have a thickness corresponding to the height of the convex portions 14b'. The glass substrate 11 on which the lower convex portions 14b' are formed is exposed to light by using a photomask and is developed. In this photomask only the pattern holes 13b with a smaller diameter are formed and heat-treated at 200° C. for one hour, whereby the convex portions are softened and hardened. Next, for the purpose for forming the convex portions 14a' with a larger height, a resist film is formed on the glass substrate 11 on which the convex portions 14b' are formed, the thickness of the resist film corresponding to the height of the convex portions 14a'. The glass substrate 11 on which the convex portions 14a' and 14b' are formed is exposed to light by using a photomask and is developed. In this photomask, only the pattern holes 13a with a larger diameter are formed and heat-treated at 200° C. for one hour, whereby the convex portions are softened and hardened. As a result, the glass substrate 11 on which the convex portions 14a' and 14b' with different heights as shown in FIG. 10a can be obtained. According to this method, it is also possible that the convex portions 14a' with a larger height are first formed, and then the convex portions 14b' with a smaller height are formed. Particularly, in this case, convex portions with a smaller height and convex portions with a larger height (convex portions with different heights) can alternately be formed, so that the continuous wave shape can be obtained.

In Examples 1 and 2, two kinds of convex portions 14a and 14b with different heights are formed. Instead of this, three kinds of convex portions with different heights can be formed.

The reasons why two or more kinds of convex portions with different heights are formed will be described below.

In the case where the heights of two adjacent convex portions are the same, lights reflected from portions of the pixel electrode, corresponding to each surface of the convex portions are likely to interfere with each other. Thus, if the height of each convex portion is made different, wavelength dependence can be reduced.

In the case where the pixel electrode 19 is formed overlapping a part of the gate bus line 22 and a part of the source bus line 24 as shown in FIG. 1, it is preferred that a convex portion is not formed on an edge of the pixel electrode 19. Due to this structure, defects of patterning of the pixel electrode 19 can be prevented. Moreover, due to this structure, the pixel electrode 19 is formed overlapping the gate bus line 22 and the source bus line 24; the pixel electrode 19 and the gate bus line 22 are formed without any gap therebetween; and the pixel electrode 19 and the source bus line 24 are formed without any gap therebetween. Thus, the area of the pixel electrode 19 can be enlarged. If the area of the pixel electrode 19 is enlarged, the numerical aperture of a display screen becomes large, resulting in a bright display. However, when there are problems of insulation defects, it is preferred that a convex portion is not formed on the overlapped portions.

The polymer resin 15 of Example 1 can be formed on the TFT 21 so as to cover the TFT 21. In Example 2, a portion of the first film forming the convex portions 14a' and 14b', positioned above the TFT 21 can be retained so as to cover the TFT 21. Alternatively, the second film 41 can be formed so as to cover the TFT 21.

In this case, there is an advantage in that the TFT 21 is not likely to be exposed and is protected.

In the above-mentioned examples, the TFT 21 is used as a switching element. The present invention is not limited thereto. Another switching element such as a Metal-Insulator-Metal (MIM) element, a diode, and a varistor can be used.

Example 3

Figure 11:
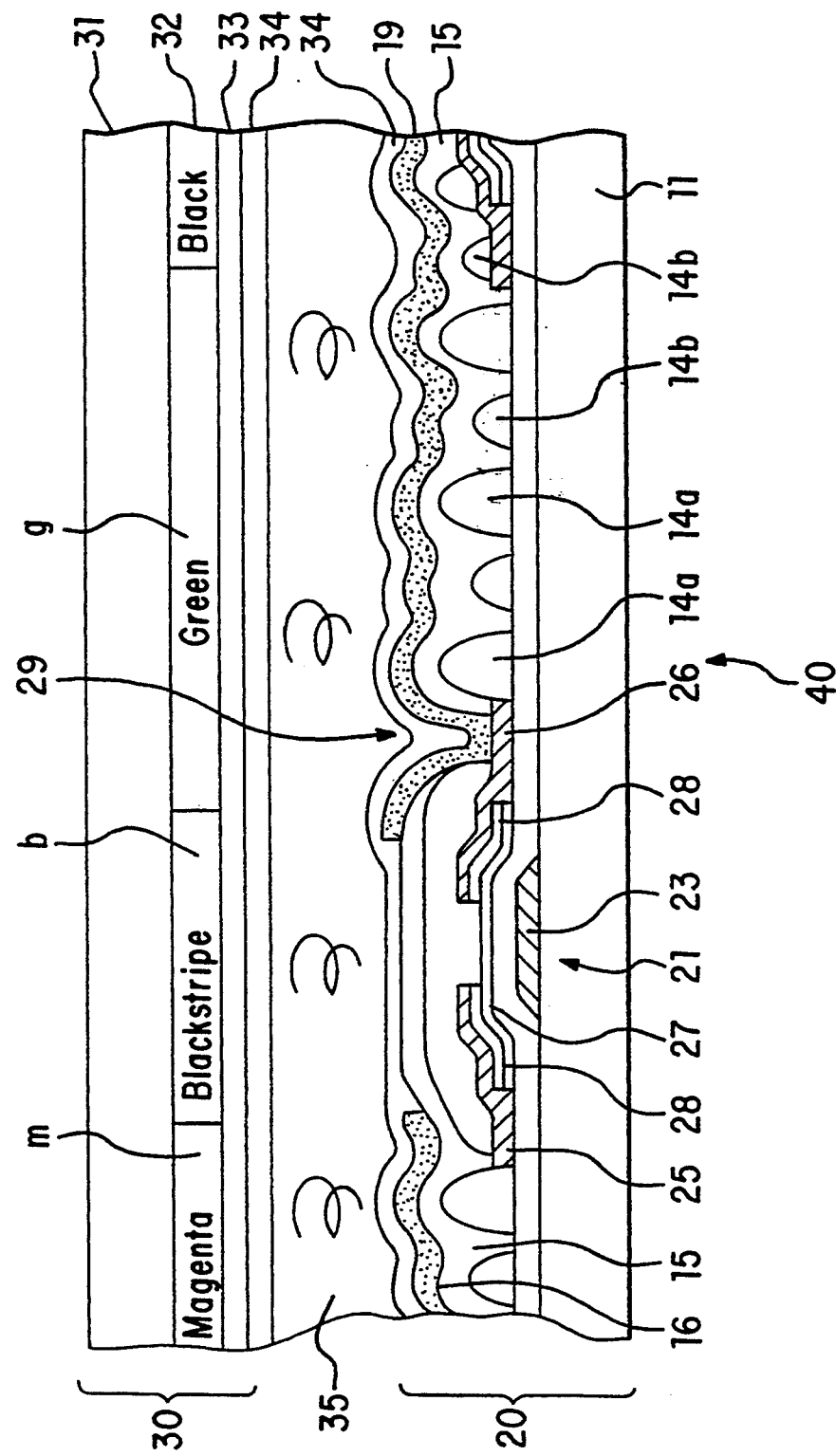
FIG. 11 is a cross-sectional view showing a reflective liquid crystal display device of Example 3.

FIG. 11 shows an example of a reflective liquid crystal display device 40 in which the reflective active matrix substrate 20 shown in FIG. 1 is used. In the reflective liquid crystal display device 40, a counter substrate 30 is provided opposing the reflective active matrix substrate 20. A liquid crystal layer 35 is sealed between the reflective active matrix substrate 20 and the counter substrate 30 by using a liquid crystal sealing layer (not shown). The liquid crystal sealing layer is obtained by screen printing of an adhesive sealing agent mixed with a spacer having a diameter of 7 μm.

The counter substrate 30 includes an insulating complementary color filter plate 32, a transparent counter electrode 33, and a liquid crystal orientation film 34. The insulating complementary color filter plate 32 is formed on a glass substrate 31. The counter electrode 33 is formed over the entire surface of the complementary color filter plate 32 and is made of an indium tin oxide (ITO) with a thickness of 100 nm. The liquid crystal orientation film 34 is also formed on a surface of the liquid crystal layer 35 on the side of the reflective active matrix substrate 20.

The reflective active matrix substrate 20 and the counter substrate 30 are obtained in the following manner:

The liquid crystal orientation films 34 are respectively coated onto the surfaces of the reflective active matrix substrate 20 and the counter substrate 30 and are baked.

The liquid crystal layer 35 is sealed between the reflective active matrix substrate 20 and the counter substrate 30 in the following manner:

The liquid crystal sealing layer is formed between the reflective active matrix substrate 20 and the counter substrate 30, followed by being vacuum deaerated. As the liquid crystal layer 35, a mixture obtained by mixing 4.5% optical active material (Trade name: S811 manufactured by Merck & Co., Inc.) with liquid crystal (Trade name: ZL12327, manufactured by Merck & Co., Inc.) is used. This liquid crystal is guest-host liquid crystal in which, for example, a black dichroic dye is mixed.

When a voltage is applied to the pixel electrode 19 and to the counter electrode 33 in the reflective liquid crystal display device 40 with the above-mentioned structure, the reflectance of incident light (which is incident upon the glass substrate at an incidence angle of 30°) in the direction of a normal line of the glass substrate is about 20%, the contrast ratio is 5, and interference color is not recognized. Thus, a satisfactory bright display can be obtained. In the reflective liquid crystal display device 40, the liquid crystal layer 35 is formed on the surface of the reflective active matrix substrate 20 on the side of the pixel electrode 19, so that there is no parallax and a satisfactory bright display can be obtained.

In the present example, the pixel electrode 19 is positioned on the side of the liquid crystal layer 35. Thus, it is desired that the heights of the convex portions 14a and 14b are made smaller than the thickness of a cell, and the slopes of the convex portions 14a and 14b are made gentle so that the orientation of the liquid crystal layer 35 is not disturbed.

Moreover, in the present example, the glass substrate 11 is used as an insulating substrate. Even though an opaque substrate such as a Si substrate is used, similar effects can be exhibited. In this case, there is an advantage in that a peripheral circuit can be integrated on the substrate.

In the present example, the pixel electrode 19 has an optical reflecting function; however, the present invention is not limited thereto. It is also possible that the pixel electrode 19 is made a transparent electrode, and the counter electrode 33 is provided with an optical reflecting function. In this case, the complementary color filter plate 32 is provided on the side of the active matrix substrate 20. Even though the counter electrode 33 having an optical reflecting function is used, the same techniques as those in Examples 1 and 2 can be applied to the counter electrode 33.

In the present example, as a display mode, the phase transition type guest-host mode is used. The present invention is not limited thereto. For example, a light absorption mode such as a two-layered type guest-host mode; a light scattering type display mode used in a polymer dispersion type LCD, etc.; and a double refraction display mode used in a ferroelectric LCD can be used.

As described above, according to the present invention, the pixel electrode or the counter electrode having an optical reflecting function is formed in a continuous wave shape, so that wavelength dependence can be reduced, resulting in a satisfactory bright display without any interference color. Furthermore, when the convex portions are formed by a photolithography process, using a photomask, the convex portions can be formed with good reproducibility, and the upper surface of the pixel electrode can also be made with good reproducibility due to the convex portions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for manufacturing a reflective substrate in which at least one electrode made of material having an optical reflecting function is provided above an insulating base substrate and an upper surface of the at least one electrode has a continuous wave shape without any flat portions, comprising the steps of:
    forming a plurality of convex portions made of a photosensitive resin with two or more different heights in a region where the at least one electrode is provided;
    forming a polymer resin film, which has an upper surface in a continuous wave shape without any flat portions, on the substrate with the convex portions; and
    forming the at least one electrode made of a material having an optical reflecting function on the polymer resin film so that the electrode has a continuous wave shape.

2. A method for manufacturing a reflective substrate according to claim 1, wherein the convex portions are formed using a photolithography technique employing a photomask.

3. A method of manufacturing a reflective substrate according to claim 1, wherein the plurality of the convex portions are configured randomly.

4. A reflective substrate in which at least one electrode made of a material having an optical reflecting function is provided above an insulating base substrate and an upper surface of the at least one electrode has a continuous wave shape without any flat portions;
    wherein a plurality of convex portions made of a photosensitive resin are provided between the insulating base substrate and the at least one electrode; and
    wherein the plurality of the convex portions have two or more different heights and are configured randomly.

5. A liquid crystal display device comprising: a reflective substrate in which at least one electrode made of a material having an optical reflecting function is provided on an insulating base substrate, and an upper surface of the at least one electrode has a continuous wave shape,
    wherein a plurality of convex portions made of a photosensitive resin are provided between the insulating base substrate and the at least one electrode;
    a second substrate provided opposing the reflective substrate;
    a liquid crystal layer sealed between the reflective substrate and the second substrate; and
    wherein the plurality of the convex portions have two or more different heights and are configured randomly.

* * * * *